US011148965B2

(12) United States Patent
Reches

(10) Patent No.: US 11,148,965 B2
(45) Date of Patent: Oct. 19, 2021

(54) PROCESS FOR THE BIOLOGICAL PURIFICATION OF NUTRIENT-CONTAMINATED WASTEWATER

(71) Applicant: Yonathan Reches, Norman, OK (US)

(72) Inventor: Yonathan Reches, Norman, OK (US)

(*) Notice: Subject to any disclaimer, the term of this patent is extended or adjusted under 35 U.S.C. 154(b) by 104 days.

(21) Appl. No.: 16/507,242

(22) Filed: Jul. 10, 2019

(65) Prior Publication Data
US 2020/0017388 A1    Jan. 16, 2020

Related U.S. Application Data

(60) Provisional application No. 62/698,669, filed on Jul. 16, 2018.

(51) Int. Cl.
| | |
|---|---|
| *C02F 9/00* | (2006.01) |
| *C02F 103/00* | (2006.01) |
| *C02F 101/16* | (2006.01) |
| *C02F 101/20* | (2006.01) |
| *C02F 3/32* | (2006.01) |
| *C02F 3/02* | (2006.01) |
| *C02F 1/66* | (2006.01) |
| *C02F 101/10* | (2006.01) |

(52) U.S. Cl.
CPC .......... *C02F 9/00* (2013.01); *C02F 1/66* (2013.01); *C02F 3/02* (2013.01); *C02F 3/327* (2013.01); *C02F 2101/105* (2013.01); *C02F 2101/163* (2013.01); *C02F 2101/166* (2013.01); *C02F 2101/203* (2013.01); *C02F 2103/001* (2013.01); *C02F 2103/002* (2013.01); *C02F 2103/005* (2013.01); *C02F 2301/046* (2013.01); *C02F 2301/08* (2013.01)

(58) Field of Classification Search
CPC .................................................. Y02W 10/10
USPC ...................... 210/150, 170, 262, 602; 119/4
See application file for complete search history.

(56) References Cited

U.S. PATENT DOCUMENTS

| | | |
|---|---|---|
| 3,955,318 A | 5/1976 | Hulls |
| 4,005,546 A | 2/1977 | Oswald |
| 4,169,050 A | 9/1979 | Serfling et al. |

(Continued)

FOREIGN PATENT DOCUMENTS

FR    2837196 B1    7/2004

*Primary Examiner* — Nina Bhat

(57) ABSTRACT

A method of purifying nutrient contaminated water for safe reuse or discharge, while recovering the fertilizer value of the contaminants. The system includes digestion tanks for the conversion by appropriate fauna and aerobic bacteria of dissolved or suspended organic contaminants into dissolved inorganic contaminants, which are flow connection with biofiltration tanks for the removal by plant root uptake of the dissolved inorganic contaminants. Generally, the digestion and biofiltration tanks are configured wherein contaminated water is conducted between one or more digestion tanks containing detritivorous or omnivorous fauna which feed on suspended contaminants and pathogens and aerobic bacteria which feed on the excreta of the fauna which will solubilize and decompose organic contaminants, oxidize nitrogen compounds into nitrates and competes with pathogens, and one or more biofiltration tanks containing pants potted in the water which uptakes dissolved inorganic contaminants.

19 Claims, 5 Drawing Sheets

(56) References Cited

U.S. PATENT DOCUMENTS

| | | | | |
|---|---|---|---|---|
| 4,209,388 | A | 6/1980 | DeFraites | |
| 4,267,038 | A | 5/1981 | Thompson | |
| 4,333,837 | A | 6/1982 | Plosz et al. | |
| 4,415,450 | A | 11/1983 | Wolverton | |
| 4,793,929 | A | 12/1988 | Kickuth et al. | |
| 4,824,572 | A | 4/1989 | Scott | |
| 4,839,051 | A | 6/1989 | Higa | |
| 4,872,985 | A | 10/1989 | Dinges | |
| 4,904,386 | A | 2/1990 | Kickuth | |
| 5,056,260 | A * | 10/1991 | Sutton | A01G 7/00 47/59 R |
| 5,078,882 | A | 1/1992 | Northrop | |
| 5,087,353 | A * | 2/1992 | Todd | C02F 3/30 210/94 |
| 5,106,504 | A | 4/1992 | Murray | |
| 5,137,625 | A | 8/1992 | Wolverton | |
| 5,156,741 | A | 10/1992 | Morrison et al. | |
| 5,174,897 | A | 12/1992 | Wengrzynek | |
| 5,180,501 | A | 1/1993 | Ngo et al. | |
| 5,254,252 | A * | 10/1993 | Drenner | C02F 3/327 210/602 |
| 5,264,127 | A | 11/1993 | Ngo et al. | |
| 5,269,094 | A | 12/1993 | Wolverton et al. | |
| 5,337,516 | A | 8/1994 | Hondulas | |
| 5,389,257 | A | 2/1995 | Todd et al. | |
| 5,437,786 | A | 8/1995 | Horsley et al. | |
| 5,462,666 | A | 10/1995 | Kimmel | |
| 5,472,472 | A * | 12/1995 | Northrop | C02F 3/1215 71/9 |
| 5,486,291 | A * | 1/1996 | Todd | C02F 3/085 210/602 |
| 5,549,817 | A | 8/1996 | Horsley et al. | |
| 5,573,669 | A | 11/1996 | Jensen | |
| 5,626,644 | A | 5/1997 | Northrop | |
| 5,670,046 | A | 9/1997 | Kimmel | |
| 5,690,827 | A | 11/1997 | Simmering et al. | |
| 5,702,593 | A | 12/1997 | Horsley et al. | |
| 5,733,453 | A | 3/1998 | DeBusk | |
| 5,736,047 | A | 4/1998 | Ngo | |
| 5,766,474 | A * | 6/1998 | Smith | C02F 3/327 210/602 |
| 5,811,007 | A | 9/1998 | Stewart et al. | |
| 5,820,759 | A | 10/1998 | Stewart et al. | |
| 5,846,423 | A | 12/1998 | Jensen | |
| 5,893,975 | A | 4/1999 | Eifert | |
| 5,951,866 | A | 9/1999 | Grove et al. | |
| 5,993,649 | A | 11/1999 | DeBusk et al. | |
| 6,065,245 | A * | 5/2000 | Seawright | A01G 31/00 47/62 R |
| 6,129,844 | A | 10/2000 | Dobelmann | |
| 6,159,371 | A | 12/2000 | Dufay | |
| 6,190,553 | B1 | 2/2001 | Lee | |
| 6,227,274 | B1 * | 5/2001 | Koyama | B65H 37/007 118/257 |
| 6,264,838 | B1 | 7/2001 | Nivens, Jr. | |
| 6,277,274 | B1 | 8/2001 | Coffman | |
| 6,322,699 | B1 | 11/2001 | Fernandez | |
| 6,406,627 | B1 * | 6/2002 | Wallace | C02F 3/327 210/602 |
| 6,416,993 | B1 | 7/2002 | Wexler et al. | |
| 6,447,681 | B1 | 9/2002 | Carlberg et al. | |
| 6,464,861 | B1 * | 10/2002 | Kobayashi | B09B 3/00 210/137 |
| 6,465,240 | B1 | 10/2002 | Wexler et al. | |
| 6,569,321 | B2 | 5/2003 | Coffman | |
| 6,652,743 | B2 * | 11/2003 | Wallace | C02F 3/06 210/170.01 |
| 6,740,232 | B1 | 5/2004 | Beaulieu | |
| 6,755,972 | B1 | 6/2004 | Kouloumbis | |
| 6,764,599 | B1 | 7/2004 | Pelz | |
| 6,783,676 | B2 | 8/2004 | Jensen | |
| 6,811,700 | B2 * | 11/2004 | Austin | C02F 3/327 210/602 |
| 6,827,855 | B2 | 12/2004 | Jennings et al. | |
| 6,830,688 | B2 | 12/2004 | Austin et al. | |
| 6,863,816 | B2 | 3/2005 | Austin et al. | |
| 6,893,565 | B2 * | 5/2005 | Greene | C05F 3/00 210/602 |
| 6,896,805 | B2 | 5/2005 | Austin | |
| 7,029,586 | B2 | 4/2006 | Austin et al. | |
| 7,082,893 | B2 | 8/2006 | Schreier et al. | |
| 7,087,169 | B2 | 8/2006 | Austin | |
| 7,101,476 | B2 | 9/2006 | Kim | |
| 7,323,107 | B2 | 1/2008 | Ames et al. | |
| 7,407,577 | B2 * | 8/2008 | Kerns | C02F 3/327 210/259 |
| 7,776,217 | B2 * | 8/2010 | Lucas | C02F 3/327 210/602 |
| 8,252,183 | B1 | 8/2012 | Massingill et al. | |
| 8,696,907 | B2 | 4/2014 | Rausch et al. | |
| 8,795,518 | B2 * | 8/2014 | Alsaffar | C05F 3/00 210/151 |
| 8,877,048 | B1 | 11/2014 | Owings | |
| 9,315,406 | B2 * | 4/2016 | Strano | C02F 9/00 |
| 9,758,412 | B2 * | 9/2017 | Gerino | C02F 3/32 |
| 10,988,397 | B2 * | 4/2021 | Wan | C02F 9/00 |
| 2003/0230529 | A1 * | 12/2003 | Austin | C02F 3/327 210/602 |
| 2005/0115893 | A1 | 6/2005 | Brune et al. | |
| 2006/0000517 | A1 | 1/2006 | Enloe | |
| 2006/0076290 | A1 | 4/2006 | Shockley et al. | |
| 2008/0135475 | A1 | 6/2008 | Limcaco | |
| 2008/0156725 | A1 | 7/2008 | Ogden | |
| 2009/0230040 | A1 | 9/2009 | Limcaco | |
| 2009/0250393 | A1 * | 10/2009 | Williams | C02F 3/327 210/602 |
| 2009/0255862 | A1 | 10/2009 | Harrison | |
| 2010/0140165 | A1 | 6/2010 | Elissen et al. | |
| 2012/0067797 | A1 | 3/2012 | Kaw | |
| 2012/0091058 | A1 | 4/2012 | Byrd | |
| 2017/0231174 | A1 * | 8/2017 | Jones | A01K 61/80 47/62 R |
| 2018/0092337 | A1 * | 4/2018 | Hori | A01K 63/04 |
| 2018/0116138 | A1 * | 5/2018 | Fung | A01K 63/042 |

* cited by examiner

PROCESS FOR THE BIOLOGICAL PURIFICATION OF NUTRIENT-CONTAMINATED WASTEWATER

CROSS-REFERENCE TO RELATED APPLICATIONS

This application claims the benefit of U.S. Provisional Patent Application Ser. No. 62/698,669, filed Jul. 16, 2018, the entire contents of which are hereby incorporated by reference for all relevant purposes.

FIELD OF THE INVENTION

The invention relates generally to a process for the biological purification of nutrient-contaminated wastewater.

BACKGROUND OF THE INVENTION

A variety of human activities produce nutrient-contaminated water as an effluent or wastewater product. Nutrient contamination is defined as one or more of the following: dissolved or suspended solids (including, but not limited to, natural contaminants, such as human or animal excreta or tissues, food waste, or plant detritus; artificial contaminants, such as pharmaceuticals, soaps, detergents, or cosmetic products; organic salts; other organics; inorganic salts; or chelated or otherwise dissolved iron or other metals), biological or chemical oxygen demand, ammonia, nitrites, nitrates, phosphates, or pathogens. Wastewater from domestic structures includes blackwater (water from toilets and urinals) and greywater (all other types of domestic wastewater), which may be disposed of in combined or separate waste streams. Most public and commercial structures produce wastewater that is characteristically similar to domestic wastewater. A variety of industrial processes, such as food processing plants and paper mills, produce effluent rich in nutrient contamination. Agricultural facilities produce nutrient-contaminated waste streams through their operations, by storm runoff from fertilized or contaminated areas, or by other methods.

Currently there are a number of solutions for the purification of nutrient-contaminated water, which are used separately or in combination with one another. The general approaches for these solutions are partitioning of suspended solids out of the contaminated water by screening or settling, anaerobic bacterial digestion, aerobic bacterial digestion, reverse osmosis, and biological remediation.

The solutions that attempt purification by partitioning of the suspended solids out of the contaminated water are limited in that they provide minimal or no positive value to the owner or operator. Such positive values could take the form of legal compliance and/or avoided or reduced operating costs. Methods utilizing partitioning of the suspended solids also require solutions for wasting the recovered solids, fail to recover the preponderance of the water or fertilizer value of contaminated water for beneficial use, and fail to substantially purify pathogens, fine suspended solids, and dissolved solids. Such methods also cannot feasibly be designed into aesthetic features, require complex and costly operation and maintenance of the mechanical partitioning apparatus, and are impractical for use on a small scale (e.g., a single residence). Furthermore, storage of the effluent from these processes is complicated, due to the potential for fouling or pathogenic contamination.

The solutions that attempt purification using anaerobic bacterial digestion are limited in that they provide minimal or no positive value (e.g., legal compliance and avoided costs) to the owner or operator, fail to recover the preponderance of the water or fertilizer value of contaminated water for beneficial use, fail to substantially purify pathogens, cannot feasibly be designed into aesthetic features, and require periodic or continuous solids removal. Furthermore, storage of the effluent from these processes is complicated, due to the potential for fouling or pathogenic contamination.

The solutions that attempt purification by aerobic bacterial digestion are limited in that they provide minimal or no positive value (e.g., legal compliance and avoided costs) to the owner or operator, generally must be performed in conjunction with periodic or continuous liquid-solid separation, necessitate a high residence time for the water, and therefore require a large system size. Such methods also tend to produce unpleasant odors, are substantially inefficient in purifying the contaminated water or waste stream from nitrogen and phosphorous contamination, fail to recover the majority of the water or fertilizer value of the contaminated water for beneficial use, cannot feasibly be designed into aesthetic features, and are impractical for use on a small scale (e.g., a single residence). Furthermore, storage of the effluent from these processes is complicated, due to the potential for fouling or pathogenic contamination.

The solutions that attempt purification by reverse osmosis are limited in that they are energy-intensive and costly, necessitate the preparatory separation of solids from the water, require the wasting of a concentrated brine, fail to substantially recover the fertilizer value of the contaminated water, cannot feasibly be designed into aesthetic features, and are impractical for use on a small scale.

The solutions relying on biological remediation are limited in that they provide minimal or no positive value (e.g., legal compliance and avoided costs) to the owner or operator, do not recover the majority of the fertilizer value of the contaminated water, are incompatible with highly-contaminated wastewater, necessarily interface with a natural source of water in addition to the contaminated water, and thus require a proximate and usable natural body of water, or alternatively require substantial flow of pure water. Such methods also require substantial energy investment for pumping water, cannot feasibly be designed into aesthetic features, and are impractical for use on a small scale. As used herein, the term "wastewater" refers to any waste stream including any or all of the following: blackwater, sewage, agricultural runoff/effluent, or nutrient-contaminated industrial wastewater.

There exists a need in the art for an improved method for the purification of contaminated water that avoids the above drawbacks and provides one or more other advantages. It would be desirable to have a process for removal of (i) a broad range of dissolved and suspended solids, (ii) biological oxygen demand (BOD), (iii) chemical oxygen demand (COD), (iv) ammonia, (v) nitrites, (vi) nitrates, (vii) phosphates, and/or (viii) pathogens from contaminated water, while recovering the fertilizer value of these contaminants. Furthermore, it would also be desirable to have a process that requires minimal or no pumping or liquid-solid separation, which can be used on both a small scale (e.g., a single family residence or a single home) and a large scale (e.g., in commercial or municipal installations). Further, it is desirable and would be useful to have such a method which is suitable for treating highly-contaminated waste streams. Still further, it would be desirable to have a process which is substantially odor-free, can be configured into an aesthetically-pleasing feature, and produces purified water which can be safely stored for later use.

SUMMARY OF THE INVENTION

The present invention advantageously fills the aforementioned deficiencies by providing a process for the biological purification of nutrient-contaminated water which is viable and economical at various size scales and degrees of contamination, which purifies water from a broad-range of contaminants, which operates continuously without the need for periodic solids removal, and which generates positive value for the user or operator by recovering both the water and fertilizer value of the contaminated water, and by growing potentially beneficial or valuable aquatic fauna and plants. The process is primarily envisioned for the purification of water from nutrient contamination. However, it is to be understood that additional contaminants, such as heavy metals and radionuclides, may be removed using this process.

It is still further an objective to generate value for the owner or operator of the process by the cultivation of potentially beneficial or valuable plants and aquatic fauna. Further still, it is an objective of the present invention to create a process which can be accommodated in a smaller volume or footprint than conventional processes for the purification of contaminated water, or which produces a higher value per unit of system volume or area of the footprint.

Disclosed is a process for the purification of contaminated water and for the growing of plants, which generally includes the following steps. The contaminated water is conducted into one or more digestion tanks (i.e., the tank(s) wherein the particle size of suspended solids is reduced and contaminants are solubilized and oxidized by the combined action of detritivorous or omnivorous fauna and aerobic bacteria) within the digestion tank(s). The digestion tank(s) is/are in fluid flow communication with one or more biofiltration tank(s) (i.e., the tank(s) wherein the contaminants, especially those which have been reduced in size, solubilized, and oxidized, are taken up by plant roots). It is to be noted that some reduction in particle size, solubilization, and/or oxidation may occur in biofiltration tanks, and that one or more tanks in the process may be designed to serve as both a digestion and biofiltration tank (i.e., digestion/biofiltration tanks, wherein the flow-connection occurs essentially by the merging of the tanks). A tank is designated herein as, for example, a digestion tank based on its primary purpose. A tank is defined as an artificial or natural receptacle, container, or structure for holding contaminated or non-contaminated water.

The method may also include one or more of the following steps or features.

Cycling (conditioning) of the system, especially upon first operation, in order to establish a stable population of fauna, aerobic bacteria, and/or plants, by the gradual introduction of one or more of the following into the digestion tank: water flow, organisms, suspended solids, feed, dissolved solids, ammonia, nitrites, nitrates, and phosphates.

The suspension of solid waste in water prior to the process or at any point in the process for purification or treatment using this process.

The mixing of contaminated water with non-contaminated or natural water before purification.

Conduction of water through one or more flow channels, which may be aerated, and which are located upstream of one or more tanks, in order to remove hydrogen sulfide, increase the content of dissolved oxygen, and/or support the nitrification of ammonia and nitrites into nitrates.

The conduction of the wastewater to be treated through one or more settling basins, which are located upstream or downstream of one or more tanks or flow channels, in order to settle out settleable solids.

The ventilation of any components of the process (including, but not limited to, tanks, flow channels, settling basins, and sumps) by methods known in the art, in order to remove any odors.

The conduction at any point in the process of some or all of the process flow stream through a semi-aquatic digestion tank (i.e., a tank that is partially and/or intermittently filled), wherein are grown non-aquatic or semi-aquatic omnivorous or detritivorous fauna, such as red wiggler earthworms (*Eisenia fetida*) or manure worms (*Lumbricus rubellus*).

At any point during the process, various properties and the quality of the wastewater being treated and/or the treated water provided by the process may be monitored. These properties include the pH, alkalinity, hardness, salinity, conductivity, chlorine content, chloramine content, suspended solids content, dissolved solids content, biological oxygen demand, chemical oxygen demand, total nitrogen content, organic nitrogen content, ammonia content, nitrite content, nitrate content, total phosphorus content, phosphate content, calcium content, iron content, potassium content, and magnesium content. If necessary based on the properties of the water stream, the present process may incorporate addition of pH buffering, dechlorinating, and/or dechloraminating compounds known in the art at any stage in the process (including as the first step following intake of water or the last step prior to discharge or use), in order to provide optimal conditions for the growth and function of the aquatic fauna, aerobic bacteria, and plants.

Further in accordance with the present invention, supplementing nutrients may be added at any point in the process. Nutrients to be supplemented include, for example, calcium, magnesium, potassium, and iron, which preferably are present in or supplemented to levels that provide for the optimal growth and function of the aquatic fauna, aerobic bacteria, and plants.

Additionally or alternatively to the above-listed operations, the present invention may also incorporate one or more of the following operations:

supplemental feeding of the aquatic fauna;

screening of water flowing into or out of any component in the process in order to control the transmission of solids or organisms into the process, between process components, or out of the process;

division of any tank or flow channel using a screen, mesh, or similar size-selective, water-conducting barrier, in order to separate incompatible organisms;

recycling of part or all of the water flowing through any component of the process upstream into an earlier stage of the process;

environmental discharge of the process effluent;

reuse of the process effluent for any purpose, notably for irrigation and greywater applications;

storage of the process effluent for later use or environmental discharge;

cultivation in any growth media of appropriate detritivorous species known to reduce the particle size of, oxide, and/or solubilize accumulated solids;

removal of accumulated solids in any component of the system (including, but not limited to, tanks, flow channels, settling basins, and sumps) by skimming, settlement, or any suitable method known in the art;

harvesting of fauna from the process for commercial value or beneficial use;

harvesting of part or all of the plants grown in the biofiltration tanks for food, animal feed, fuel, or other beneficial uses;

cultivation of aquatic plants, including algae, for biofiltration;

use of any plants grown in the system, in whole or in part, for feeding fauna grown in the system;

cultivation of plants for the uptake of iron, heavy metals, or radionuclides in any biofiltration or digestion/biofiltration tanks;

cultivation of the plants in the biofiltration tanks according to methods known in the arts of aquaculture and aquaponics, including deep water culture, nutrient film technique, or media-filled growth beds;

support of some or all of the weight of plants on the tank bottom;

support of some or all of the weight of plants using structural lattices or any suitable method known in the art;

staggering of planting, pruning, harvest, and other horticultural cycles in order to maintain a fairly constant biofiltration rate;

design of the process apparatus as an aesthetic feature, such as for landscaping;

deliberate addition of surfaces, such as laying gravel or expanded clay pellets, in any of the tanks to accommodate aerobic (and especially nitrifying) bacteria;

the inclusion in any of the tanks, flow channels, settling basins, and/or sumps of aquatic fauna known in the art to prey on mosquito larvae, for control of mosquito populations and a potential role in the digestion of contaminants;

inclusion in any of the biofiltration or digestion/biofiltration tanks of aquatic fauna known to clean plant roots or otherwise support plant health;

control and moderation of the temperature of the system or any of its components, including encapsulation in a greenhouse or other structure, partial or complete burial, insulation, artificial heating or cooling, or any suitable method known in the art;

use of artificial light, as a supplement or substitute to sunlight, to support plant growth;

separation of some or all of the suspended solids from the contaminated water inflow by screening, settling, or any suitable method known in the art;

conduction of some or all of the substantially liquid fraction from liquid-solid separation through one or more biofiltration tanks (which may perform a nitrifying function);

conveyance of some or all of the substantially solid fraction to one or more digestion tanks for consumption by aquatic fauna, and the appropriate disposal or use of any remaining solids;

inclusion of one or more sumps at any stage in the process in order to collect the outflow of one or more steps in the process, or of the entire process, for storage, buffering against changes and fluxes in water volume and composition, and/or for redistribution; and use of chlorine, chloramine, or another suitable disinfectant at any stage of the process, including intake and discharge, to treat the water for pathogenic contamination.

In certain embodiments, therefore, the present invention is directed to a method for purifying wastewater, the method comprising: (i) introducing the wastewater into a first treatment zone comprising a digestion tank, the digestion tank comprising aquatic fauna, naturally-occurring bacteria, and an aqueous medium comprising water and one or more pathogens; (ii) passing the wastewater through the digestion tank, whereby during said passing the aquatic fauna and naturally-occurring bacteria kill at least a fraction of the pathogens present in the water and consume nutrients present in the wastewater and introduce waste into the wastewater, thereby producing treated wastewater having a reduced nutrient and pathogen content and comprising waste produced by the aquatic fauna; (iii) passing the treated wastewater through a second treatment zone comprising a biofiltration tank, the biofiltration tank comprising one or more plants and an aqueous medium comprising water and one or more pathogens, the treated wastewater being introduced into and passed through the aqueous medium and during said passing through the biofiltration tank aqueous medium the naturally occurring bacteria kill a portion of the pathogens, convert residual ammonia ($NH_3$) and ammonium ($NH_4^+$) to nitrite ($NO_2^-$), and convert residual nitrite ($NO_2^-$) to nitrate ($NO_3^-$) and the plants consume the waste generated in the digestion tank, thereby forming a treated water stream, wherein said first treatment zone and second treatment zone are in fluid flow communication; and (iv) recovering the treated waste stream from the second treatment zone.

In further embodiments, the present invention is directed to a method for purifying wastewater, the method comprising: (i) introducing the wastewater into a flow channel, the flow channel containing at least one pH buffer; (ii) from the flow channel, introducing the wastewater into a first treatment zone comprising a digestion tank, the digestion tank comprising water and aquatic fauna, wherein the wastewater from the flow channel has pH of at least 6.0 (and typically a pH of no more than 8.0); (iii) passing the wastewater through the first treatment zone, whereby during said passing through the first treatment zone the aquatic fauna consume nutrients present in the wastewater and introduce waste into the wastewater, thereby producing treated wastewater having a reduced nutrient content and comprising waste produced by the aquatic fauna; and (iv) passing the treated wastewater through a second treatment zone comprising a biofiltration tank, the biofiltration tank comprising one or more plants, whereby during said passing through the second treatment zone the plants consume the waste.

The present invention is further directed to wastewater treatment systems. In certain embodiments, the system comprises: a flow channel comprising a pH buffer; a first treatment vessel, the first treatment vessel comprising water and aquatic fauna; a second treatment vessel, the second treatment vessel comprising water and one or more plants; and conduits for maintaining the flow channel, first treatment vessel, and second treatment in fluid flow communication with the flow channel upstream of the first treatment vessel and the first treatment vessel upstream of the second treatment vessel.

This disclosure will now provide a more detailed and specific description that will make reference to the accompanying drawings. The drawings and specific descriptions of the drawings, as well as any specific or alternative embodiments discussed, are intended to be read in conjunction with the entirety of this disclosure. The process for the purification of contaminated water and for the growing of plants may, however, be embodied in many different forms and should not be construed as being limited to the embodiments set forth herein; rather, these embodiments are provided by way of illustration only and so that this disclosure will be thorough, complete and fully convey understanding to those skilled in the art.

DETAILED DESCRIPTION

Figure 1:
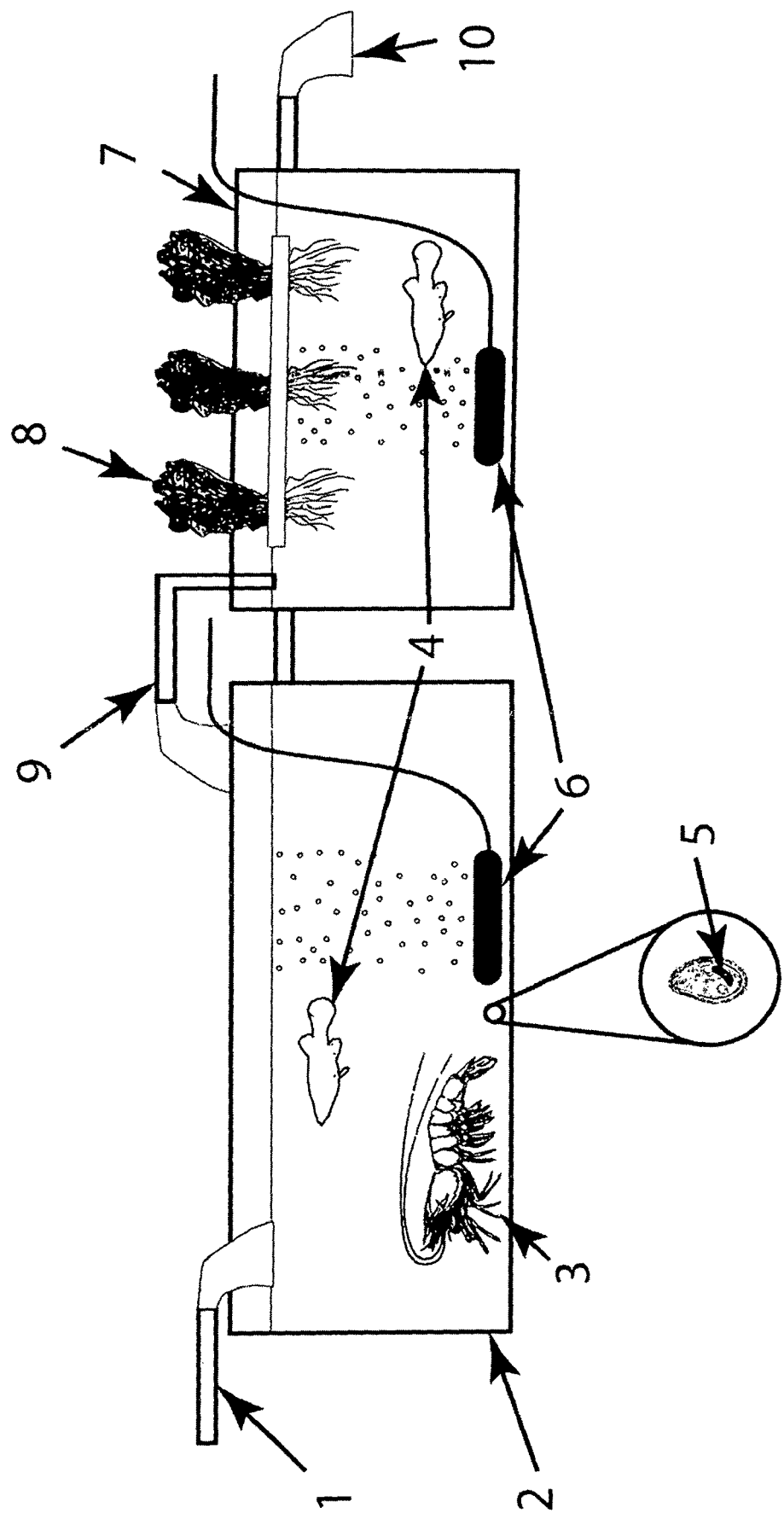
FIG. 1 is a side view of a basic configuration for the purification of a nutrient-rich wastewater inflow using one digestion tank and one biofiltration tank.

The present invention is directed to a process for the purification of contaminated water and for the growing of plants. The disclosed method is unique when compared with other known processes and solutions in that it simultaneously: (1) provides a positive value to the owner or operator of the system by the substantial recovery of both the water and fertilizer value of nutrient-contaminated water; (2) incorporates the growth of potentially beneficial fauna and plants; (3) can readily be designed as an aesthetic, substantially odor-free feature; (4) can be used on all scales, from small (single household) to large (such as commercial or municipal); (5) requires minimal or no liquid-solid separation; (6) produces an effluent substantially purified of suspended solids, biological and chemical oxygen demand, all forms of nitrogen, all forms of phosphorous, and pathogens; and (7) produces an effluent stream that is suitable for tank storage.

The disclosed method is unique when compared to other methods for the purification of nutrient-contaminated water because it relies on the synergistic and complementary biological functions of aquatic fauna, aerobic bacteria, and plants to remove large quantities of a wide variety of contaminants from the water. Generally, the process of the present invention involves exposing the wastewater to be treated to aquatic fauna that consumes contaminants present in the wastewater and provide waste that is suitable to provide nutrients for plant growth downstream in the process to exposure of the wastewater to the aquatic fauna. Specifically, suspended contaminants are the primary source of food for omnivorous or detritivorous fauna, which reduce the particle size of suspended contaminants, convert some of the suspended contaminants into a dissolved form, and prey upon pathogens. In certain embodiments, the suspended contaminants are the only source of food for the aquatic fauna present in the digestion tank. Additionally, the process is designed to support the health and function of naturally-occurring aerobic bacteria, which convert suspended contaminants into dissolved forms, compete with pathogens, and convert dissolved solids into forms which are less toxic to aquatic fauna and/or more readily taken up as nutrients by plant roots. Finally, plants are rooted in the water stream in order to remove the digested contaminants (most notably nitrates and phosphates). The method is designed to support the health, function, and population size of all of the fauna, aerobic bacteria, and plants used in the process, as well as to facilitate the designed interactions and exchanges between these organisms by spatial arrangement and flow patterns. Advantageously, the present invention is suitable for treating wastewater having a higher degree of contamination than other methods, the methods do not require the presence of and/or access to a natural water source. Furthermore, the present invention involves an advance in the art since it is able to provide purified water while also extracting and utilizing fertilizer value present in the wastewater.

Generally, the present methods include a digestion step within a tank designed for this purposes where the wastewater to be treated is introduced into and passed through the tank, which contains aquatic fauna. The aquatic fauna (along with naturally-occurring bacteria) kill at least a fraction of the pathogens present in the water and consume nutrients present in the wastewater. The aquatic fauna also introduce waste into the wastewater which waste and its derivatives, as detailed elsewhere herein, provides nutrients for plant growth. Thus, within the digestion tank is formed a treated wastewater stream having a reduced nutrient and pathogen content and further including waste from the fauna.

This digestion step is at least combined with the biofiltration step detailed below and may be further combined with one or more other steps, or operations described below.

Cycling

During the first operation of the system, a stable population of aerobic bacteria, and especially nitrifying bacteria, is cultivated by cycling using pure water with added ammonia. For this purpose, commercially-available ammonia may be used, or a small population of fauna may be introduced and fed so as to generate ammonia within the system. The concentration of ammonia, nitrites, and nitrates is monitored in all tanks and flow channels, and once it is observed that the ammonia is substantially converted to nitrites and that the nitrites are substantially converted to nitrates, aquatic fauna are gradually introduced into the digestion tank(s) and plants are gradually introduced into the biofiltration tank(s) (specifications for the cultivation of aquatic fauna and plants are detailed below). At this stage, ammonia is no longer added to the pure water inflow. In parallel to the gradual introduction of aquatic fauna and plants, pure water in the inflow is gradually replaced with the contaminated wastewater stream for purification. At the end of the cycling process, stable populations of aquatic fauna, aerobic bacteria, and plants are established, and the inflow into the system consists entirely of the contaminated wastewater. Overall, therefore, in certain embodiments the water within a first treatment zone/digestion tank is cycled and/or inoculated for the establishment of stable colonies of nitrifying bacteria.

Solids Removal

Prior to introduction into the digestion tank, the wastewater to be treated may be subjected to a separation method for separating the stream into solid and liquid fractions. For example, the stream of contaminated wastewater may be mechanically separated by sieving or comparable methods into substantially solid and substantially liquid fractions. The substantially solid fraction that was separated from the nutrient-contaminated wastewater inflow is fed into the digestion tank(s) in the digestion step. The substantially liquid fraction may be passed through a gravitational flow channel. The flow channel is designed to provide enough surface area and residence time to substantially allow for nitrification of ammonia into nitrites, and subsequently nitrites into nitrates. Artificial aeration by methods known in the art is used along the flow channel to increase dissolved oxygen content, maintain any residual solids in suspension, and provide a viable environment for nitrifying bacteria.

In certain embodiments, calcium carbonate gravel or one or more comparable pH buffers are placed within the flow channel for pH buffering to a pH of at least 6.0 to prevent against the acidifying effects of nitrification, provide additional surface area to accommodate nitrifying bacteria, and supply calcium to the water. The calcium carbonate gravel is periodically replenished due to erosion. The content of dissolved chlorine and chloramine is monitored at the inflow to the flow channel, and ascorbic acid or one or more other suitable dechlorinating and/or dechloraminating agents known in the art may be continually added at the head of the flow channel at a rate sufficient to neutralize any chlorine or chloramine. Other pH buffers are suitable as well. For example, potassium bicarbonate or one or more other suitable pH buffers are continuously added to the head of the flow channel and at several points along the flow channel to maintain a pH gradient from approximately 8.5 at the channel head, for optimal nitrification rate, to approximately 7.0 at the channel outflow, which will support optimal plant growth. Overall, the pH of the wastewater introduced into the digestion tank typically is at least about 6.0, at least about 7.0, or from about 6.0 to about 8.0 (e.g., about 7.0).

Overall the methods of the present invention are suitable for treatment of wastewater selected from the group consisting of blackwater, greywater, sewage, agricultural runoff/effluent, nutrient-contaminated industrial wastewater, or a combination of any one or more of these. Nutrients present in the wastewater comprise suspended solids, dissolved organic solids, chemical oxygen demand (COD), biological oxygen demand (BOD), ammonia ($NH_3$), ammonium ($NH_4^+$), nitrite ($NO_2^-$), and/or nitrate ($NO_3^-$). The waste provided by the aquatic fauna during the digestion step includes any one or more of suspended solids having a reduced particle size as compared to the suspended solids of the nutrients, dissolved organic solids, carbon dioxide ($CO_2$), phosphate ($PO_4^{3-}$), ammonia ($NH_3$), ammonium ($NH_4^+$), nitrite ($NO_2^-$), and/or nitrate ($NO_3^-$). The carbon dioxide present in the treated wastewater in the digestion tank(s) is generated from the oxidation and solubilization of organic contaminants and may be bound in the form of dissolved carbonate or bicarbonate species. If necessary, at least a portion of the carbon dioxide may be released, such as by the action of aeration, or vented from the digestion tank. In certain embodiments, the BOD and/or COD the wastewater being treated and/or treated waste water provided thereby are monitored.

Plant Growth

The flow channel is connected by gravitational flow or other suitable method to a number of biofiltration tanks (e.g., primary biofiltration tanks) arranged in sequence or parallel, in which useful or otherwise beneficial plants are grown. In some biofiltration tanks, plants are grown using the media-filled growth bed method with continuous flow. In other biofiltration tanks, plants are grown using the media-filled growth bed method using the ebb and flow regime. In other biofiltration tanks, plants are grown using the deep water culture method. Still in other biofiltration tanks, plants are grown using the thin film method. In the remaining biofiltration tanks, plants are directly supported by the tank bottom. In all biofiltration tanks, additional support is provided for the plants using a structural lattice or comparable methods known in the art. Suitable methods for plant growth are depicted graphically in FIG. 3.

In biofiltration tanks using the deep water culture method or where the plants are directly supported by the tank bottom, gravel or other suitable sources of surface area are introduced to accommodate nitrifying bacteria, and mosquitofish (*Gambusia affinis*) or other suitable aquatic fauna are grown to prey upon mosquito larvae to prevent reproduction of mosquitoes in the system, maintain the cleanliness of plant roots, and consume residual suspended solids and any plant detritus. The populations of these species are restocked as needed, although they are generally self-sustained by reproduction within the tank.

In the biofiltration tanks using the media growth bed method, whether using a continuous flow or an ebb and flow regime, red wiggler earthworms, manure worms, and/or other suitable detritivores are grown in order to digest any residual solids, prey upon pathogens, clean plant roots, and support the decomposition of plant residuals following plant death or harvest. The populations of these species are restocked as needed, although they are generally self-sustained by reproduction within the tank. The growth medium, where used, provides extensive surface area for nitrifying bacteria to convert any ammonia and nitrites residual from the flow channel, or which are produced by the action of the detritivores, into nitrates. The plants take up contaminants (primarily nitrates and phosphates) from the water stream. The combination of solid digestion and pathogen predation by the fauna and the maintenance of an aerobic conditions in the primary biofiltration tanks creates a substantially odor-free environment.

The quality of the water in all biofiltration tanks is monitored and adjusted as follows: pH is buffered to approximately 7.0 by the addition of calcium carbonate and/or potassium bicarbonate or other suitable compounds. The content of dissolved iron is monitored. If the content of dissolved iron is at least that required for plant health (typically 2¬3 mg/L), plants play a purifying role by taking up the dissolved iron. If the iron content is lower than required for plant health, a suitable form of chelated iron (e.g., Fe-DTPA) is added. Dissolved potassium and calcium are supplemented using calcium carbonate and/or potassium bicarbonate or other suitable additives as needed for the health and productivity of aquatic fauna, aerobic bacteria, and plants. Biological oxygen demand (BOD) and chemical oxygen demand (COD) are monitored, as are the contents of dissolved oxygen, suspended and dissolved solids, ammonia, nitrites, nitrates, and phosphates. Water is conducted from the primary biofiltration tanks to the digestion step of the process. The digestion step of the process may be conducted using one or more digestion tanks, and/or one or more combined-functionality digestion/biofiltration tanks. The tanks utilized in the digestion step may be arranged in sequence or in parallel.

Digestion

Generally, the digestion tanks contain detritivorious and/or omnivorious fauna and typically contain fish. The digestion tanks contain *Tilapia* fish (genus *Tilapia* or similar), catfish (order Siluriformes), loaches (family Cobitidae), and/or one or more other species of aquatic fauna which individually or collectively are known to consume suspended solids, prey on pathogens, and/or perform the function of mosquito predation. These fish are restocked as needed. Additionally or alternatively, the digestion/biofiltration tanks may contain cherry shrimp (*Neocaridina davidi*), mosquitofish, and/or one or more other species collectively perform the following functions: consumption of suspended solids, pathogen predation, mosquito predation, and cleaning of plant roots. The populations of these species are restocked as needed, although they are generally self-sustained by reproduction within the tank. Aquatic fauna are harvested from all digestion and digestion/biofiltration tanks for use or commercial value. Artificial aeration is used in all digestion and digestion/biofiltration tanks to increase dissolved oxygen content, retain solids in suspension, and provide a viable environment for the aquatic fauna, nitrifying bacteria, and, where applicable, plant roots.

Some tanks in the digestion step perform only a digestion function (digestion tanks). Other tanks in the digestion step perform a dual digestion and biofiltration function (digestion/biofiltration tanks).

In all digestion/biofiltration tanks, beneficial plants are grown to perform a biofiltration function, consisting of the uptake of contaminants (primarily nitrates and phosphates). Plant roots provide shelter for the aquatic fauna in the digestion/biofiltration tanks, particularly for fry. The plants are harvested, pruned, and replanted on a staggered basis, in order to maintain a roughly constant biofiltration rate. In some digestion/biofiltration tanks, plants are grown using the media-filled growth bed method with continuous flow. In other digestion/biofiltration tanks, plants are grown using the media-filled growth bed method using the ebb and flow regime. In other digestion/biofiltration tanks, plants are grown using the deep water culture method. Still in other digestion/biofiltration tanks, plants are grown using the thin film method. In the remaining digestion/biofiltration tanks, plants are directly supported by the tank bottom. In all digestion/biofiltration tanks, additional support is provided for the plants using a structural lattice or comparable methods known in the art. Expanded clay pellets or other suitable forms of supplemental surface area are placed in all digestion and digestion/biofiltration tanks in order to accommodate nitrifying bacteria. The combination of solid digestion and pathogen predation by the fauna and the maintenance of aerobic conditions in the primary biofiltration tanks creates a substantially odor-free environment. The quality of the water in the digestion and digestion/biofiltration tanks is monitored and adjusted as follows: pH is buffered to approximately 7.0 by the addition of calcium carbonate and/or potassium bicarbonate or other suitable compounds. The content of dissolved iron is monitored. If the content of dissolved iron is at least that required for plant health (typically 2-3 mg/L), plants play a purifying role by taking up the dissolved iron. If the content is lower than required for plant health, Fe-DTPA or other suitable form of chelated iron is added. Dissolved potassium and calcium are supplemented using calcium carbonate and/or potassium bicarbonate or other suitable additives as needed for the health and productivity of aquatic fauna, aerobic bacteria, and/or plants. Biological and chemical oxygen demand are monitored, as are the contents of dissolved oxygen, suspended and dissolved solids, ammonia, nitrites, nitrates, and phosphates. Additionally, kelp powder and feed or other suitable sources of nutrition are periodically fed to the aquatic fauna, to provide supplemental nutrition, notably calorie, protein, potassium, and magnesium. These supplementary food sources have subsequent benefits for plant growth, as nutrients are excreted by aquatic fauna. Aerobic bacteria compete with pathogens and feed on aquatic fauna excreta and any organic contaminants present in the inflow, thereby producing inorganic forms of nitrogen (primarily ammonia) and carbon dioxide. Nitrifying bacteria convert the ammonia to nitrite, and subsequently to nitrate. Outflow from all of the digestion tanks and digestion/biofiltration tanks passes through a grate or other suitable method, to prevent the passage of organisms and solids to other components in the system.

Whether conducted in a separate biofiltration tank or in a combined digestion/biofiltration tank, the waste consumed by the plants in the biofiltration tank comprises any one or more of small dissolved organic molecules, phosphate ($PO_4^{3-}$), nitrate ($NO_3^-$), calcium ($Ca^{2+}$), iron ($Fe^{2+}$ or $Fe^{3+}$), potassium ($K^+$), and magnesium ($Mg^{2+}$)

Secondary Biofiltration

Where the wastewater is first treated in a combined digestion/biofiltration step, the treated waste water is typically subjected to a secondary biofiltration operation. The secondary biofiltration step may be conducted by a method involving a number of biofiltration tanks arranged in sequence or parallel, in which beneficial plants are grown.

In some secondary biofiltration tanks, plants are grown using the media-filled growth bed method with continuous flow. In other secondary biofiltration tanks, plants are grown using the media-filled growth bed method using the ebb and flow regime. In other secondary biofiltration tanks, plants are grown using the deep water culture method. Still in other secondary biofiltration tanks, plants are grown using the thin film method. In the remaining secondary biofiltration tanks, plants are directly supported by the tank bottom. In all secondary biofiltration tanks, additional support is provided for the plants using a structural lattice or comparable methods known in the art.

In secondary biofiltration tanks using the deep water culture method or where the plants are directly supported by the tank bottom, gravel or other suitable sources of surface area are introduced to accommodate nitrifying bacteria, and mosquitofish or other suitable aquatic fauna are grown to prey upon mosquito larvae to prevent reproduction of mosquitoes in the system, maintain the cleanliness of plant roots, and consume residual suspended solids and detritus from the plants. The populations of these species are restocked as needed, although they are generally self-sustained by reproduction within the tank.

In the secondary biofiltration tanks using the media growth bed method, whether using a continuous flow or an ebb and flow regime, red wiggler earthworms, manure worms, or other suitable detritivores are grown in order to digest any residual solids, prey upon pathogens, clean plant roots, and support the decomposition of plant residuals following plant death or harvest. The populations of these species are restocked as needed, although they are generally self-sustained by reproduction within the tank. The growth medium, where used, provides extensive surface area for nitrifying bacteria to convert any ammonia and nitrites into nitrates. The plants take up contaminants (primarily nitrates and phosphates) from the water stream. The combination of solid digestion and pathogen predation by the fauna and the maintenance of an aerobic conditions in the primary biofiltration tanks creates a substantially odor-free environment.

The quality of the water in all secondary biofiltration tanks is monitored and adjusted as follows: pH is buffered to approximately 7.0 by the addition of calcium carbonate and/or potassium carbonate or other suitable compounds. The content of dissolved iron is monitored. If the content of dissolved iron is at least that required for plant health (typically 2¬3 mg/L), plants play a purifying role by taking up the dissolved iron. If the content is lower than required for plant health, Fe-DTPA or other suitable form of chelated iron is added. Dissolved potassium and calcium are supplemented using calcium carbonate and/or potassium bicarbonate or other suitable additives as needed for the health and productivity of aquatic fauna, aerobic bacteria, and plants. Biological and chemical oxygen demand are monitored, as are the contents of dissolved oxygen, suspended and dissolved solids, ammonia, nitrites, nitrates, and phosphates.

Treated Wastewater

The outflow of the secondary biofiltration step is collected into a sump. Before or after collection, the treated waste water may be subjected to a filtration operation. Fractions of the flow are recycled to the inlets of the flow channel and each of the tanks, in order to dilute the concentration of contaminants entering these components and in order to provide additional residence time for the water, so that residual nitrates and phosphates are optimally absorbed by plants. The remaining fraction of the flow is conducted to a storage tank for later use in irrigation and greywater applications.

In order to control and moderate the air and water temperatures, all components are partially buried in the native soil and enclosed in a greenhouse. Artificial ultraviolet light is provided for the plants in all biofiltration tanks. The entire system is designed using principles of aesthetic landscaping, with the flow channel and tanks designed as water features and visually attractive vegetation grown in the biofiltration and digestion/biofiltration tanks.

The methods of the present invention conducted by combining any or all of the methods discussed above provide numerous advantages over prior methods for treating wastewater. One such advantage is based on the fact that the arrangement of following generation of nutrients for plant growth by the aquatic fauna with plant growth is that he a positive value for the methods of the present invention is growth and production of beneficial plants. That is, the methods of the present invention involve growth of the beneficial plants during the biofiltration step. In certain preferred embodiments, the methods of the present method involve combining treating blackwater in a method that includes generation of beneficial plants as a product. As noted elsewhere herein, other advantages over the prior art include, for example, that the present invention does not require an interface with a suitable, natural body of water, does not require a substantial source of pure water and that the invention purifies highly-contaminated wastewater to a point that it can be used for agricultural or greywater purposes. Overall, therefore, the present invention provides treated water having reduced waste content as compared to the wastewater inflow to the system fed to the aquatic fauna.

The following discussion describes certain particular options for practicing methods of the present invention. These descriptions are not intended to be limiting.

FIG. 1 shows a basic configuration for the purification of a nutrient-rich wastewater inflow 1, illustrating the functions of the digestion tank(s) 2 and the biofiltration tank(s) 7. The water is conducted into a digestion tank 2. Detritivorous and/or omnivorous aquatic fauna 3 such as cherry shrimp are stocked in the tank, and may reproduce or require restocking. These fauna feed on suspended solids and pathogens, and contribute to the digestion of contaminants into plant nutrients. Aquatic fauna for mosquito predation 4 such as mosquitofish are optionally stocked in the tank, and may reproduce or require restocking. These fauna prey on mosquitos in the larval stage, and help to control mosquito populations in the vicinity of the tanks. Aerobic bacteria 5 are naturally occurring in the environment, and reproduce in favorable conditions. These bacteria primarily inhabit surfaces. In fact, a wide variety of aerobic bacteria are found in the system, each contributing a different function. On the whole, their functions include competition with pathogens, conversion of suspended solids into dissolved solids, conversion of dissolved organic solids into inorganic forms, and conversion of nitrogen and phosphorous into forms that are useful to plants as nutrients (nitrates and phosphates). Artificial aeration 6, such as fine bubble aeration, is typically used to support the health and function of aquatic fauna 3 and 4, aerobic bacteria 5, and plants rooted in the water 8. Artificial aeration 6 is not, strictly speaking, required for the process, but is desirable. Water is conducted from the digestion tank 2 to the biofiltration tank 7. Plants are grown rooted in the water 8, here shown in the deep water culture configuration. A number of other suitable configurations are known in the art, with some shown in FIG. 3. A fraction of the water may be recycled 9. The purified effluent 10, which approximately constitutes the volume of intake minus the volume of losses to evaporation and evapotranspiration, may be used (e.g., in irrigation or greywater uses), or may be discharged.

Figure 2:
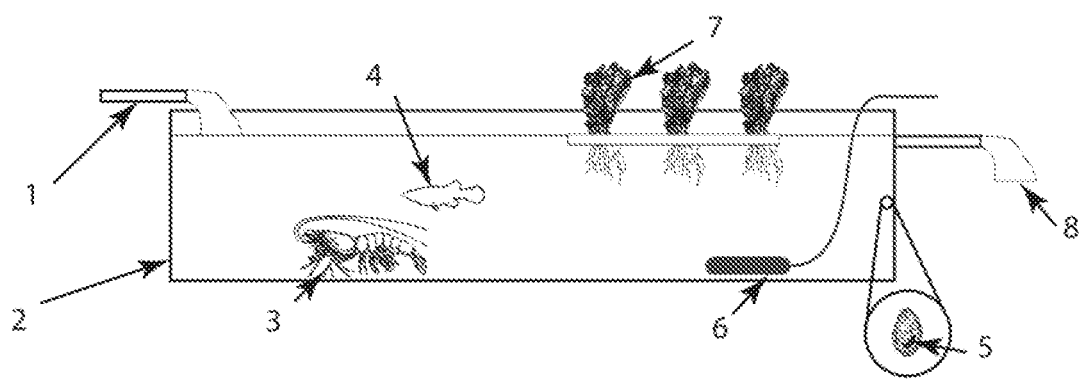
FIG. 2 is a side view of a basic configuration for the purification of a nutrient-rich wastewater inflow using a single tank with combined digestion/biofiltration functionality.

FIG. 2 shows an alternative configuration to FIG. 1 for the purification of a nutrient-rich wastewater inflow 1, illustrating the combined digestion/biofiltration tank(s) 2. Detritivorous or omnivorous aquatic fauna 3 such as cherry shrimp are stocked in the tank, and may reproduce or require restocking. These fauna feed on suspended solids and pathogens, clean plant roots, and contribute to the digestion of contaminants into plant nutrients. Aquatic fauna for mosquito predation 4 such as mosquitofish are optionally stocked in the tank, and may reproduce or require restocking. These fauna prey on mosquitos in the larval stage, and help to control mosquito populations in the vicinity of the tank. Aerobic bacteria 5 are naturally occurring in the environment, and reproduce in favorable conditions. These bacteria primarily inhabit surfaces. In fact, a wide variety of aerobic bacteria are found in the system, each contributing a different function. On the whole, their functions include competition with pathogens, conversion of suspended solids into dissolved solids, and conversion of nitrogen and phosphorous into forms that are useful to plants as nutrients (nitrates and phosphates). Artificial aeration 6, such as fine bubble aeration, is typically used to support the health and function of aquatic fauna 3 and 4, aerobic bacteria 5, and plants rooted in the water 7. Artificial aeration 6 is not, strictly speaking, required for the process, but is desirable. Plants are grown rooted in the water 7, here shown in the deep water culture configuration. A number of other suitable configurations are known in the art, with some shown in FIG. 3. The purified effluent 8, which approximately constitutes the volume of intake minus the volume of losses to evaporation and evapotranspiration, may be used (e.g., in irrigation or greywater uses), or may be discharged.

Figure 3:
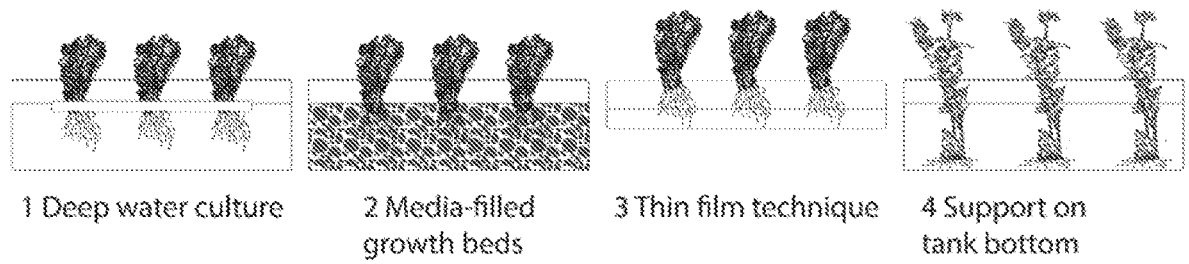
FIG. 3 is a side view of a number of appropriate methods for the cultivation of plants for biofiltration.

FIG. 3 shows a number of appropriate methods for the growth of plants in the system for biofiltration. Deep water culture 1 is a method whereby plants are floated on the top of the tank, with their roots dangling in the water column. Plants may be selected to float naturally (e.g., duckweed), or more commonly their weight is supported by floats using an appropriate lightweight material, such as polyethylene foam board. Generally, mosquitofish or other aquatic fauna are grown in this setup for mosquito predation. In media-filled growth beds 2, plants are partially or fully supported by a substantially inert and water-conductive growth medium, such as gravel, sand, or expanded clay pellets. The roots of the plants grow between the grains of the medium. In some cases, detritivores such as red wiggler earthworms or manure worms are grown in the tank, in order to facilitate the decomposition of any particulate matter that may accumulate between media grains. Water is conducted through the tank (for purposes of discussion of media-filled growth beds, the term "tank" is herein equivalent to "growth bed") by continuous flow between the particles (in which case the tank is generally only minimally filled), or by an ebb and flow cycle, whereby the tank is cyclically filled and emptied (typically by an auto-siphon). This configuration frequently or continuously yields large and dynamic air-water interfaces, which creates good aeration for the detritivores, aerobic bacteria, and plant roots. Since this method does not involve standing water, it is generally not necessary or possible to stock the tank with aquatic fauna for mosquito predation. In the thin film technique 3, plants are grown in shallow troughs, with the weight of the plant supported by the trough structure. Water runs in the trough in a thin film, and plant roots have access to the flowing water. The thin flow profile results in large and dynamic air-water interfaces, and therefore ensures good aeration for the plant roots and aerobic bacteria. Since this method does not involve standing water, it is generally not necessary or possible to use aquatic fauna for mosquito predation in the thin film component. Support directly on the tank bottom 4 may be appropriate in cases where the plant exhibits substantial structural root or rhizomatic growth. For example, bamboo (subfamily Bambusoideae) forms robust and broad support structures and could be well supported in this manner. Generally, mosquitofish or other aquatic fauna are grown in this setup for mosquito predation. In any of these methods 1-4, additional supports, such as a structural lattice (not shown), may be used as necessary to support the weight of plants.

Figure 4:
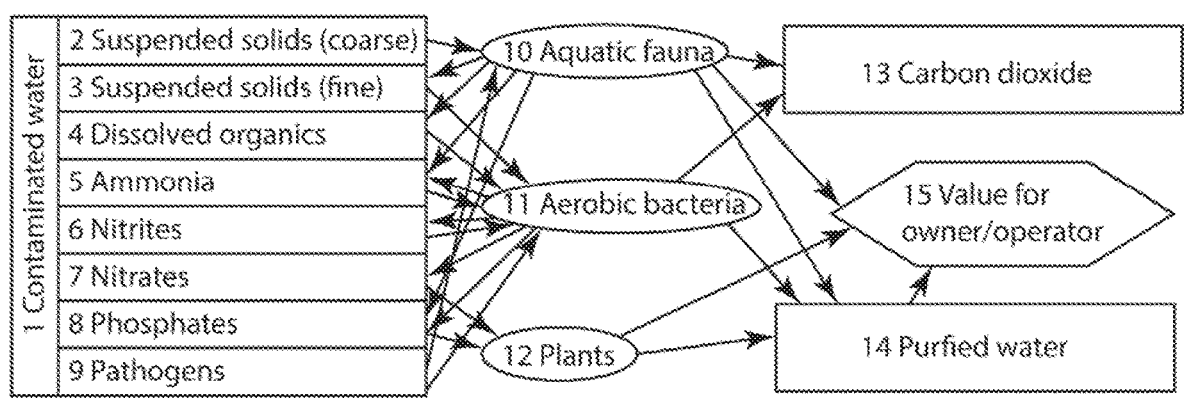
FIG. 4 illustrates synergistic and complementary functions of aquatic fauna, aerobic bacteria, and plants to purify water and generate value to the owner/operator of the process.

FIG. 4 illustrates the processes whereby the synergistic and complementary functions of aquatic fauna 10, aerobic bacteria 11, and plants 12 generate value to the owner/operator of the process 15 by purifying contaminated water 1 into purified water 14 and through the yield of potentially beneficial or valuable aquatic fauna 10 and plants 12. Coarse suspended solids 2 are consumed by aquatic fauna 10 and converted into excreta consisting substantially of fine suspended solids 3, dissolved organics 4, ammonia 5, and phosphates 6. The aquatic fauna additionally produce carbon dioxide 13 and prey upon pathogens 9. Aerobic bacteria 11 consume fine suspended solids 3 and dissolved organics 4, and convert them into excreta consisting substantially of ammonia 5 and phosphates 8. Certain aerobic bacteria 11 convert ammonia 5 to nitrites 6 and nitrites 6 to nitrates 7. This conversion (called "nitrification") is essential to the success of the process, because nitrates 7 present both a lower toxicity to aquatic fauna, aerobic bacteria, and plant and a higher bioavailability to plants of nitrogen than ammonia 5 and nitrites 6. The aerobic bacteria additionally produce carbon dioxide 13, and compete with pathogens 9. The plants 12 consume nitrates 7 and phosphates 8. To a minor extent, they may also consume carbon dioxide 13 (not shown), although carbon dioxide 13 is primarily removed by off-gassing into the ambient atmosphere, which is accelerated by artificial aeration. Following the action of the plants, the water is substantially purified of suspended solids 2-3, dissolved organics 4, ammonia 5, nitrites 6, nitrates 7, phosphates 8, and pathogens 9, and is suitable for use, storage or discharge. Thus, value is generated for the operator/user of the process 15, consisting of the positive value of the purified water and any residual fertilizer value that it may have (due to any nitrogen or phosphorous still present in one of several forms); the compliance with regulations regarding the handling and discharge of contaminated water; and the avoided liability of a contaminated wastestream.

Figure 5:
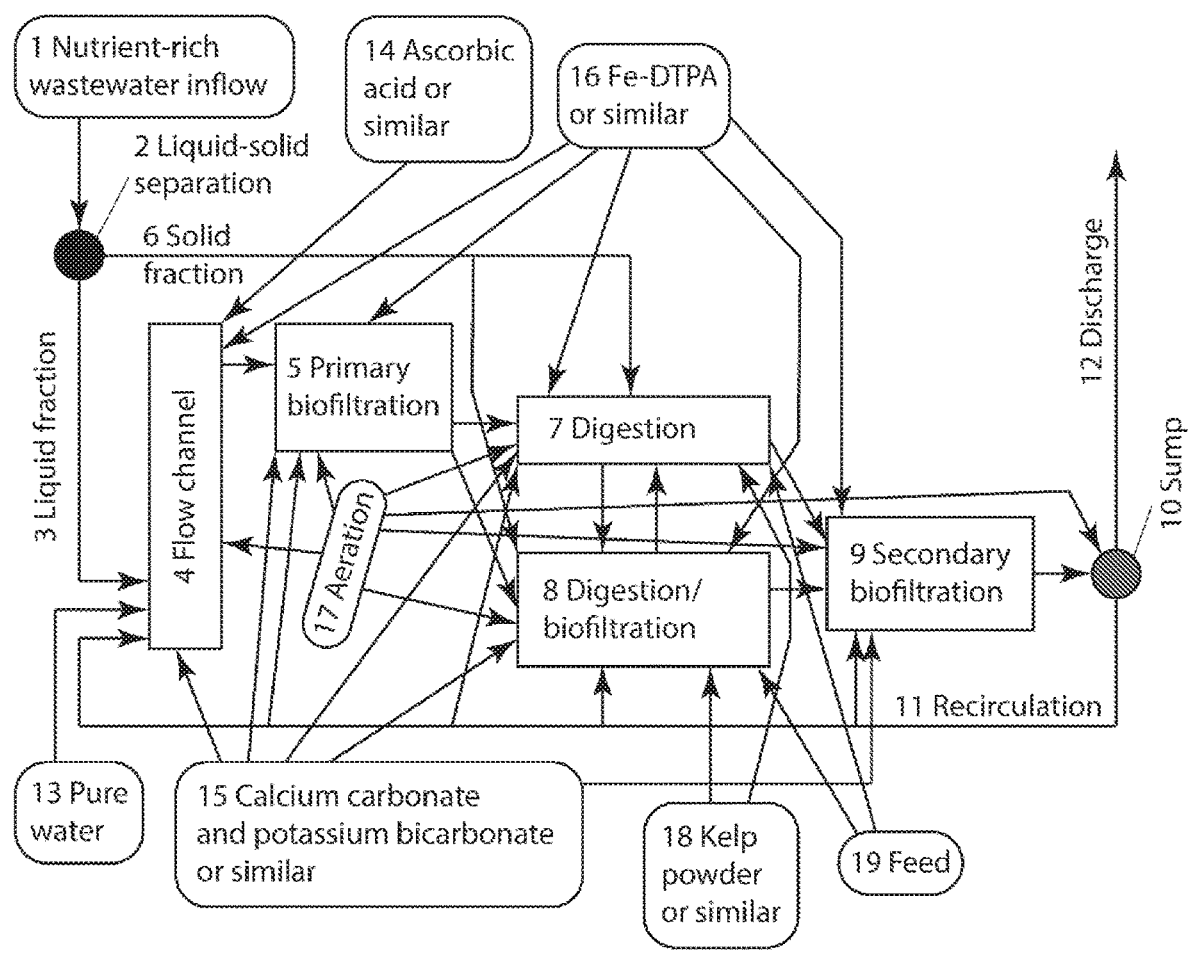
FIG. 5 shows a complete version of the process.

FIG. 5 shows a complete version of the process, with material inputs shown in rounded rectangles and process steps shown in rectangles. A nutrient rich water inflow 1 is conducted through a liquid-solid separation 2. The substantially liquid fraction 3 is conducted to a flow channel 4. Pure water 13 is added to the flow channel 4 for dilution and improved flow. Ascorbic acid 14 or another dechlorinator/dechloraminator known in the art, calcium carbonate and potassium bicarbonate 15 or other pH buffers and sources of calcium and potassium, and Fe-DTPA 16 or other sources of chelated iron are added to the flow channel 4. Artificial aeration 17 such as fine bubble aeration or other suitable method is provided in the flow channel 4. The water is conducted from the flow channel 4 to primary biofiltration 5, consisting of one or more tanks constructed by one or more of the appropriate methods shown in FIG. 3 (including an explanation of appropriate flow regimes, aeration methods, and mosquito control). Calcium carbonate and potassium bicarbonate 15 or other pH buffers and sources of calcium and potassium, and Fe-DTPA 16 or other sources of chelated iron are added to the primary biofiltration tanks 5. Artificial aeration 17 is provided (except in tanks where the media-filled growth bed or thin film methods are used for biofiltration). Water is conducted from the primary biofiltration step 5 to a set of digestion 7 and digestion/biofiltration 8 tanks, which together constitute the digestion step, with possible auxiliary biofiltration functionality. The solid fraction 6 which was separated 2 from the nutrient-rich wastewater inflow 1 is added into the digestion tanks 7 and the digestion/biofiltration tanks 8. In the digestion tanks 7, aquatic fauna are grown which, together with naturally-occurring aerobic bacteria, convert organic contaminants to inorganic forms of carbon (notably carbon dioxide), nitrogen (notably nitrate), and phosphorous (notably phosphate). In the digestion/biofiltration tanks 8, aquatic fauna are grown which provide a similar function to those in the digestion tanks 7, and additionally plants are grown which take up contaminants (notably nitrates and phosphates) as nutrients. The plants performing the biofiltration function of the digestion/biofiltration tanks 8 are grown by one or more of the appropriate methods shown in FIG. 3. Calcium carbonate and potassium bicarbonate 15 or other pH buffers and sources of calcium and potassium, Fe-DTPA 16 or other sources of chelated iron, kelp powder 18 and feed 19 or other sources of nutrition for aquatic fauna and plants are added to the digestion tanks 7 and digestion/biofiltration tanks 8. Artificial aeration 17 is provided in all of these tanks. Flow is conducted between any digestion tanks 7 and digestion/biofiltration tanks 8, so that the organisms living these tanks can perform complementary decomposition functions. The aquatic fauna in the digestion tanks 7 and the digestion/biofiltration tanks 8 are harvested for beneficial use and commercial value. From the digestion tanks 7 and the digestion/biofiltration tanks 8, flow is conducted to the secondary biofiltration step 9. All outflow from the digestion tanks 7 and the digestion/biofiltration tanks 8 is screened in order to prevent the transfer of aquatic fauna between tanks, and the transmission of solids into the secondary biofiltration tanks 9. The secondary biofiltration step 9, consists of one or more biofiltration tanks constructed by one or more of the appropriate methods shown in FIG. 3 (including an explanation of appropriate flow regimes, aeration methods, and mosquito control). Calcium carbonate and potassium bicarbonate 15 or other pH buffers and sources of calcium and potassium, and Fe-DTPA 16 or other sources of chelated iron are added to the secondary biofiltration tanks 9. Artificial aeration 17 is provided (except in tanks where the media-filled growth bed method is used for biofiltration). The flow from the secondary biofiltration step is conducted to a sump 10, which can accommodate changes in the volume of water in the process. The sump is aerated 17 and stocked with mosquitofish or similar species for the control of the local mosquito population. A fraction of the water collected in the sump 10 is recirculated 11 to all channels and tanks in the process 4, 5, 7-9, and a fraction is discharged 12 into the environment.

System Configuration
Tank Configuration

The configuration of the system, including the size of tanks, number of tanks, choice of arrangement (e.g., in sequence vs. in parallel), etc., will vary from system to system based on a number of factors, notably the type, composition, and flow rate of the nutrient-contaminated water inflow, anticipated changes in these parameters over time, the local climate and topography, the choice of aquatic fauna and plants, compatibility with other structures, and the discretion of the designers. The following design principles are suggested as general rules of thumb, which may serve as the basis for system design. These suggestions are not requirements or hard-and-fast rules, but rather can and should be adjusted based on system-specific considerations and the experience of the designers:

1. The choice to use primary biofiltration, digestion/biofiltration, or secondary biofiltration: The successful application of this invention will require some biofiltration function, consisting of one or more of primary biofiltration, digestion/biofiltration, and secondary biofiltration. The choice of which one, two, or three of these functionalities to include in a particular application depends on a number of factors, explored below:
   a. Primary filtration: The function of primary biofiltration is to filter out inorganic nitrogen before the digestion step. Therefore, this step is recommended when the nutrient-contaminated wastewater contains a high concentration of ammonia, nitrites, or nitrates. As a rule of thumb, an inorganic nitrogen content of at least 50 mg/L would generally justify the use of primary biofiltration. The use of primary biofiltration is notably advantageous when the preponderance of inorganic nitrogen is found as ammonia and/or nitrites, which are toxic to fish at low concentrations. This is because primary biofiltration provides a good opportunity for nitrification, particularly when the media-filled growth bed method is used. Primary biofiltration is also particularly well suited for wastewater streams wherein it is easy to substantially separate suspended solids. For example, the effluent of a poultry processing plant contains large fragments of suspended solids (organs and bones), which can be readily screened from the stream and conveyed to the digestion step. This would reduce the expense and effort required for primary biofiltration.
   b. Digestion/biofiltration: The use of one or more combined digestion/biofiltration tanks is attractive because it may reduce the complexity, required size, and operating costs of the system. However, this design choice is contingent either on the biocompatibility of all organisms grown in a single tank, or otherwise on special measures such as separation of species by a screen or net. Generally, the use of digestion/biofiltration tanks is desirable for small to medium systems, or where a high premium is placed on system simplicity or aesthetics. For example, the digestion step for the wastewater of a single home would best be conducted in a combined digestion/biofiltration tank. Such a tank could accommodate species such as cherry shrimp and mosquitofish, which could procreate without the need for restocking. Thus, the homeowner would avoid the need to maintain numerous tanks and the flow apparatus between them, and furthermore to restock the aquatic fauna. The single tank could be designed into an attractive water feature in the owner's yard. The choice to separate digestion and biofiltration tanks will generally be advantageous in larger applications, or where a high premium is placed on the commercial value of the aquatic fauna. For example, the effluent from a poultry farm would be compatible with the raising of *Tilapia*, which are capable of consuming large quantities of bird feces. *Tilapia* also eat plant roots, so that they cannot be compatibly grown in the same space as plants, unless special measures are used to separate the *Tilapia* from the plants. On this scale, the owner of the system could hire and train a system operator, which would allow for a much more complex system than can reasonably be applied at the domestic scale. Therefore, the use of separate digestion tanks and biofiltration tanks, with appropriate flow connection between them, would be advised.
   c. Secondary biofiltration: The function of secondary biofiltration is to filter the metabolic products (primarily inorganic nitrogen and phosphates) from aquatic fauna and aerobic bacteria. A secondary biofiltration step is almost always advisable in any system that does not include one or more digestion/biofiltration component(s), or in which such component(s) does not provide sufficient biofiltration. However, in some cases it may be possible and desirable to design a system relying only on primary biofiltration, without a secondary biofiltration step. In these cases, it may be advisable to recirculate water from the digestion step to the primary biofiltration step, which essentially carries out the function of secondary biofiltration.

Nutrient Depletion

Nutrient depletion in biofiltration: Absent the use of additives, the concentration of plant nutrients (notably inorganic nitrogen, phosphates, potassium, calcium, and iron) will be lower at the outflow from a biofiltration tank than at the inflow. Indeed, this reality is an important facet of water purification according to the present invention. However, this introduces the challenge that the plants situated at the end of a biofiltration step have access to fewer nutrients than plants situated at its beginning. Although this differential may be repaired by measures such as the use of additives, it is preferred to limit such measures, which may reduce the efficacy of the purification process. Instead, it is recommended to grow plants with low nutritional requirements, such as *Egeria* (genus *Egeria*) or shrubby *Potentilla* (*Potentilla fruticosa*), near the end of the biofiltration step.

Additives

Additives may be used and incorporated into various stages of the process, including digestion and/or biofiltration. It is proposed that additives may be required for the success of the process, including, but not limited to calcium carbonate, potassium bicarbonate, Fe-DTPA, kelp powder, feed for fauna, and ascorbic acid. These additives serve a number of functions: (1) pH buffering to circa 7.0, (2) neutralization of chlorine or chloramine, and (3) supplementation of nutrients required for the health of fauna, aerobic bacteria, or plants (notably calcium, potassium, iron, magnesium, calories, and protein). In almost every embodiment of this process, pH buffering will be essential at one or more steps, so that the addition of calcium hydroxide and/or potassium hydroxide or other pH buffers will generally be important to the success of the process. The other two functions of the additives may or may not be required, based on the composition of the nutrient-contaminated water. For example, domestic blackwater contains essentially enough iron to maintain plant health, whereas domestic greywater would require supplemental iron for treatment. Additionally, domestic blackwater will generally contain no chlorine or chloramine, because these will have been neutralized by the vitamin c in urine. Other types of wastewater, such as domestic greywater, may contain residual chlorine or chloramine from municipal tap water. Generally, in the interests of purification and cost reduction, minimal use of additives is preferred. Therefore, when one or more parameters of the water inflow are sufficient to meet the requirements of the process, it is preferred not to use additives in order to improve those parameters. In some cases, when the water quality parameters are insufficient, nutrients may be supplemented by the combination of two or more waste streams with distinct compositions. For example, the effluent from a poultry processing plant, which is rich in calories, protein, and iron, but poor in potassium and likely to be chlorinated, may be combined with the effluent from a fruit cannery, which is rich in potassium and ascorbic acid (a known dechlorinating agent).

System Sizing

Sizing growth area for biofiltration: In the biofiltration tank, the key design parameter is the growth area, which is the horizontal cross-sectional area of the tank(s) in which plants are grown. In aquaponics systems, typical feeding rates to maintain plant health are on the range of F=60-100 g of feed per $m^2$ of water surface area per day. In the disclosed process, this rule of thumb must be converted from mass of feed to appropriate water-quality parameters of the nutrient-contaminated water inflow: (1) non-organic nitrogen content (primarily consisting of ammonia, nitrites, and nitrates), and (2) total nitrogen content (which notably includes organic nitrogen). In order to convert between nitrogen contents to feed rates, it is estimated that fish feed consists of approximately 30% protein, and that protein consists of approximately 16% nitrogen. Then a mass factor of 20.8 may be used to convert the feed rate to an equivalent rate of nitrogen loading, $F_N$=2.9-4.8 g/d of total nitrogen in the inflow for every 1 $m^2$ of growth area.

Sizing growth area for primary biofiltration (when used): An important function of primary filtration is to remove non-organic nitrogen in order to reduce the toxicity of water to aquatic fauna. Therefore, the total area dedicated to primary filtration should be sufficient to treat the non-organic nitrogen content of the nutrient-contaminated water. Given an inflow rate Q (L/d) and an inorganic nitrogen concentration $N_I$ (mg/L), then the growth area used in primary biofiltration $A_{G,P}$ ($m^2$) is given by $$A_{G,P} = \frac{N_I Q}{F_N}.$$

It is suggested to select a value of $F_N$ within the range 2.9-4.8 g/d-$m^2$ based on the nutritional needs of the plants. Heavy feeders, such as bell peppers (*Capsicum annuum*), tomatoes (*Solanum lycopersicum*), and corn (*Zea mays*), consume high quantities of nitrogen, and therefore will require comparatively less growth area than light feeders, such as lettuce (*Lactuca sativa*), basil (*Ocimum basilicum*), and spinach (*Spinacia oleracea*).

Sizing total growth area for biofiltration: The total growth area for biofiltration is the combined growth area for plants in all primary biofiltration tanks, digestion/biofiltration tanks, and secondary biofiltration tanks. This area should be sufficient to treat the entire nitrogen content in the system, including both organic and inorganic nitrogen. Given an inflow rate Q (L/d) and a total nitrogen concentration $N_T$ (mg/L), then the total growth area for biofiltration $A_{G,T}$ ($m^2$) is given by $$A_{G,T} = \frac{N_T Q}{F_N}.$$

Sizing volume for digestion tanks: In the digestion tank(s), the key design parameter is the total volume for the habitation of aquatic fauna, $V_H$. Essentially, this volume represents the size required to sustain a population of aquatic fauna that will sufficiently metabolize solid contaminants into plant nutrients, when a moderate stocking density is used (on the order of 500 g biomass of aquatic fauna per 15-30 L of volume which is habitable to the aquatic fauna). In aquaponics systems, the volume of aquaculture tanks is sized as $V_H$=R$A_{G,T}$, where R is typically 200-400 L/$m^2$. However, in aquaponics systems, all nitrogen entering the system comes from feed. In the present invention, nitrogen enters as either organic (potential food source for aquatic fauna) or inorganic (cannot be metabolized by aquatic fauna). Therefore, for an organic nitrogen concentration $N_O$ (mg/L), and an inorganic nitrogen concentration $N_I$ (mg/L), it is recommend to size the tanks in the digestion step so that their combined volume is $$V_H = RA_{G,T} \frac{N_O}{N_O + N_I}.$$

High values of R (≥400 L/$m^2$) would constitute a conservative design, which would support the health of aquatic fauna and buffer against variations in water composition, flow rates, and environmental factors.

Parallel function of the digestion/biofiltration tanks: It should be noted that any digestion/biofiltration tanks in the system may be used to satisfy in parallel both the requirements for growth area for biofiltration, and the volumetric requirement for growth of aquatic fauna.

Nitrification Surface Area

Required surface area for nitrification: In most embodiments, the preponderance of nitrification would occur in the primary filtration and digestion steps. Therefore, it is important to provide sufficient surface area in these steps for the habitation of nitrifying bacteria. The rate of nitrification is a function of many system parameters, most notably pH, temperature, and the concentration of ammonia and nitrite. However, as a rule of thumb, a nitrification rate of $N_{typ}$=0.8 mg/$m^2$/day is suggested as a conservative design rate. Generally, the sides of the container will be insufficient to provide this amount of surface area. Therefore, it is suggested to supplement the surface area, such as by laying down a medium with a high specific surface area $A_{SS,M}$. Calcium carbonate gravel may sometimes be advantageous as a medium, in that it has secondary uses as a pH buffer and a source of calcium. Expanded clay pellets may sometimes be advantageous as a medium, since their pore structure gives rise to a large $A_{SS,M}$ (on the order of 3 $m^2$/g). If the provision of a medium is chosen as a method for providing extra surface area, the following design principles are suggested:

When primary biofiltration is used: The nitrification of inorganic nitrogen should substantially be achieved within the primary biofiltration step. Therefore, in this step, the mass of medium provided in the primary biofiltration step $M_{M,P,B}$ should be sufficient so that the area available to nitrifying bacteria in this step is given by $$A_{N,PB} = M_{M,PB} A_{ss,M} \geq \frac{N_I Q}{N_{typ}}.$$

In the media-filled growth bed method, this requirement is trivially met. The nitrification of the inorganic nitrogen produced by the aquatic fauna should substantially occur within the digestion step, in order to avoid toxicity of ammonia or nitrites to aquatic fauna. The mass of medium provided in the digestion step $M_{M,V}$ should be sufficient so that the area available to nitrifying bacteria in this step is given by $$A_{N,V} = M_{M,V} A_{ss,M} \geq \frac{N_O Q}{N_{typ}}.$$

When no primary biofiltration is used: The nitrification of all forms of nitrogen should substantially be achieved within the digestion step. Then $$A_{N,V} = M_{M,V} A_{ss,M} \geq \frac{N_T Q}{N_{typ}}.$$

EXAMPLES

Examples of Waste Streams to be Treated and Treated Streams to be Produced

The composition of the waste streams to be treated will vary depending on source, season, time of day, and a multitude of other factors. The treated waste stream may be designed for compliance with user needs (e.g., legal requirements or requirements related to agricultural use of the treated water). The examples illustrate the sorts of waste streams that may be treated using this methods with a range of expected treated streams to be produced by the method.

Different features, variations, and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiment or enumerated variations. Many modifications, variations, and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

What is claimed is:

1. A method for purifying wastewater, the method comprising:

a.) introducing wastewater containing pathogens and contaminants into a first treatment zone comprising a digestion tank, the digestion tank comprising detrivorous or omnivorous aquatic fauna, aerobic bacteria, and an aqueous medium comprising water and one or more pathogens;

b.) pasting the wastewater through the digestion tank, wherein detrivorous or omnivorous aquatic fauna and aerobic bacterial consume said contaminants and pathogens, thereby producing treated waste water having a reduced nutrient and pathogen content and waste produced by the aquatic fauna;

c.) introducing the treated waste water through a second treatment zone comprising a biofiltration tank, which includes aerobic bacteria which consume pathogens and converts residual ammonia ($NH_3$) and ammonium ($NH_4^+$) to nitrite ($NO_2^-$) and convert residual nitrite ($NO_2^-$) to nitrate ($NO_3^-$) and further includes one or more plants which filter materials and nutrients from the digested waste water thereby forming a treated water stream wherein said first treatment zone and second zone are in fluid communication; and d.) recovering the treated waste stream from the second treatment zone.

| Contaminant content | Waste stream to be treated | | | | Treated stream to be produced |
|---|---|---|---|---|---|
| | Municipal sewage | Domestic blackwater | Agricultural wastewater | Poultry plant effluent | |
| Total P (mg/L) | 5-25 | 20-60 | 5-50 | 10-40 | 0-3 |
| Total N (mg/L) | 20-100 | 130-180 | 500-1,000 | 150-600 | 0-20 |
| N as ammonia (mg/L) | 10-50 | 65-90 | 150-350 | 50-400 | 0-0.5 |
| BOD (mg/L) | 50-400 | 400-1,400 | 2,500-8,500 | 1,300-2,000 | 0-50 |
| COD (mg/L) | 200-1,000 | 800-3,200 | 3,000-9,000 | 3,000-8,000 | 0-100 |
| Suspended solids (mg/L) | 100-500 | 1,000-5,000 | 1,000-3,000 | 500-6,000 | 0-10 |
| pH | 7.0-8.5 | 8.8-9.1 | 6.0-8.0 | 5.5-9.0 | 6.5-8.5 |
| Ca (mg/L) | 25-100 | 35-90 | 20-100 | 30-150 | 0-10 |
| Fe (mg/L) | 0.5-1 | 0.2-3 | 0.1-3 | 3-10 | 0-1 |
| K (mg/L) | 10-30 | 65-85 | 10-100 | 60-140 | 0-10 |
| Mg (mg/L) | 10-50 | 5-25 | 10-40 | 5-40 | 0-5 |
| Coliforms (count/100 mL) | $10^6$-$10^9$ | $10^7$-$10^{10}$ | $10^4$-$10^6$ | $10^6$-$10^9$ | $10^1$-$10^3$ |

2. The method of claim 1 wherein water from a natural source is not introduced into the first treatment zone or the second treatment zone.

3. The method of claim 1 wherein nutrients present in the wastewater are the only feed source for the aquatic fauna introduced into the system.

4. The method of claim 1 wherein the plants cultivated within the biofiltration tank constitute agricultural products with potential commercial value.

5. The method of claim 1, wherein the wastewater comprises one or more selected from the group consisting of blackwater, greywater, sewage, agricultural runoff/effluent, nutrient-contaminated industrial wastewater, and combinations thereof.

6. The method of claim 1, wherein nutrients in the wastewater comprise one or more of suspended solids, dissolved organic solids, chemical oxygen demand (COD), biological oxygen demand (BOD), ammonia ($NH_3$), ammonium ($NH_4^+$), nitrites ($NO_2^-$) and nitrates ($NO_3^-$).

7. The method of claim 4, wherein the aquatic fauna digests the suspended solids in the wastewater in the first treatment zone, thereby converting the suspended solids into suspended solids having a reduced particle size, dissolved organic solids, carbon dioxide ($CO_2$), phosphate ($PO_4^{3-}$), ammonia ($NH_3$), ammonium ($NH_4^+$), nitrite ($NO_2^-$), and/or nitrate ($NO_3^-$).

8. The method of claim 1 wherein the plants in the biofiltration tank remove one or more contaminants selected from the group consisting of dissolved organic molecules, phosphate ($PO4^{3-}$), nitrate ($NO_3^-$), calcium ($Ca^{2+}$), iron ($Fe^{2+}$ or $Fe^{3+}$), potassium ($K^+$), and magnesium ($Mg^{2+}$).

9. The method of claim 1 wherein the digestion tank of the first treatment zone comprises one or more aquatic fauna selected from a group consisting of Tilapia (Genus *Tilapia* fish), carp (family Cyprindiae), catfish (order Siluriformes), or loaches (family Cobitidae), cherry shrimp (species *Neocaridina davidi*), and mosquitofish (species *Gambusia affinis*).

10. The method of claim 1 wherein the water within the digestion tank of the first treatment zone is aerated while the wastewater passes through the first treatment zone.

11. The method of claim 1 wherein the wastewater is passed through a flow channel prior to introduction into the first treatment zone, the flow channel containing at least one pH buffer, whereby the pH of the wastewater introduced into the first treatment zone has a pH of at least about 6.0.

12. The method of claim 11 wherein the pH buffer is selected from the group consisting of calcium carbonate, calcium bicarbonate, calcium hydroxide, potassium carbonate, potassium bicarbonate, potassium hydroxide, and combinations thereof.

13. The method of claim 11 wherein the wastewater introduced into the flow channel is monitored for chlorine content, the method father comprising introducing one or more dechlorinating agents into the wastewater.

14. The method of claim 1 wherein the first treatment zone and second treatment zone are contained within the same vessel.

15. The method of claim 1 wherein the second treatment zone comprises a plurality of biofiltration tanks.

16. The method of claim 1 wherein aquatic fauna which are predators of mosquito larvae are introduced into the biofiltration tank of the second treatment zone, and the reproduction of mosquitos in the secondary treatment zone is thereby inhibited.

17. The method of claim 1 wherein said detrivorous aquatic fauna is introduced into the second treatment zone biofiltration tank wherein said aquatic fauna consume residual suspended solids and pathogens and said aerobic bacteria convert solids into nutrients for uptake by said plants.

18. The method of claim 1 wherein a portion of the treated water stream is recycled to the first treatment zone.

19. A method for purifying wastewater, the method comprising:
   introducing the wastewater into a flow channel, the flow channel containing at least one pH buffer;
   from the flow channel, introducing the wastewater into a first treatment zone comprising a digestion tank, the digestion tank comprising water and aquatic fauna, wherein the wastewater from the flow channel has pH of at least 6.0;
   passing the wastewater through the first treatment zone, whereby during said passing through the first treatment zone the aquatic fauna consume nutrients present in the wastewater and introduce waste into the wastewater, thereby producing treated wastewater having a reduced nutrient content and comprising waste produced by the aquatic fauna;
   passing the treated wastewater through a second treatment zone comprising a biofiltration tank, the biofiltration tank comprising one or more plants, whereby during said passing through the second treatment zone the plants consume the waste.

* * * * *